United States Patent
Xu et al.

(10) Patent No.: US 8,064,537 B2
(45) Date of Patent: Nov. 22, 2011

(54) METHOD AND APPARATUS FOR DYNAMICALLY ADJUSTING A TRANSMISSION POWER SPECTRAL DENSITY OF PILOT AND DATA SYMBOLS

(75) Inventors: Hao Xu, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 812 days.

(21) Appl. No.: 11/932,518

(22) Filed: Oct. 31, 2007

(65) Prior Publication Data

US 2008/0107161 A1    May 8, 2008

Related U.S. Application Data

(60) Provisional application No. 60/864,342, filed on Nov. 3, 2006, provisional application No. 60/888,905, filed on Feb. 8, 2007.

(51) Int. Cl.
*H04K 1/02* (2006.01)
(52) U.S. Cl. ..................................... 375/297
(58) Field of Classification Search .................. 375/297
See application file for complete search history.

(56) References Cited

U.S. PATENT DOCUMENTS

| | | | | |
|---|---|---|---|---|
| 6,044,103 A * | 3/2000 | Weaver, Jr. | ..................... | 375/130 |
| 6,128,350 A * | 10/2000 | Shastri et al. | ................. | 375/260 |
| 6,914,487 B1 * | 7/2005 | Doyle et al. | ................. | 330/297 |
| 7,054,597 B2 * | 5/2006 | Rosnell | ........................ | 455/110 |
| 7,428,426 B2 * | 9/2008 | Kiran et al. | .................... | 455/522 |
| 7,542,517 B2 * | 6/2009 | Kroeger | ........................ | 375/296 |
| 2002/0176480 A1 * | 11/2002 | Wheatley et al. | ............. | 375/130 |
| 2003/0031269 A1 * | 2/2003 | Verbin | ........................ | 375/295 |
| 2004/0162097 A1 | 8/2004 | Vijayan et al. | | |

FOREIGN PATENT DOCUMENTS

| | | |
|---|---|---|
| CA | 2262315 | 8/2000 |
| CA | 2298289 | 8/2000 |
| RU | 2251800 | 5/2005 |

OTHER PUBLICATIONS

International Search Report, PCT/US07/083560, International Search Authority, European Patent Office, Feb. 13, 2008.
Written Opinion, PCT/US07/083560, International Search Authority, European Patent Office, Feb. 13, 2008.

* cited by examiner

*Primary Examiner* — Juan A Torres
(74) *Attorney, Agent, or Firm* — Jonathan T. Velasco; Peter A. Clevenger (57) ABSTRACT

A power spectral density of a pilot symbol and a data symbol is controlled for an uplink transmission by a mobile station in a wireless network by determining a power spectral density of at least one of the data symbol and the pilot symbol based on a peak-to-average ratio (PAR) of at least one of the data symbol and the pilot symbol. A power spectral density of at least one of the data symbol and the pilot symbol is then dynamically adjusted based on a difference between the PAR of the data symbol and a PAR of the pilot symbol. Changes in the power spectral densities of the pilot symbol and the data symbol are signaled to a receiving side of the uplink transmission. If acceptable by the receiving side, the pilot symbol and the data symbol are transmitted to the receiving side of the uplink transmission.

25 Claims, 6 Drawing Sheets

METHOD AND APPARATUS FOR DYNAMICALLY ADJUSTING A TRANSMISSION POWER SPECTRAL DENSITY OF PILOT AND DATA SYMBOLS

CLAIM OF PRIORITY UNDER 35 U.S.C. §119

The present application for patent claims priority to Provisional Application Nos. 60/864,342 entitled "A METHOD AND APPARATUS FOR TRANSMIT PSD ADJUSTMENT FOR E-UTRA UL" and 60/888,905 entitled "TRANSMIT PSD ADJUSTMENT FOR E-UTRA UL" filed Nov. 3, 2006 and Feb. 8, 2007, respectively, and both assigned to the assignee hereof and hereby expressly incorporated by reference herein.

BACKGROUND

1. Field

The present disclosure relates generally to wireless communication, and more specifically to dynamic adjustment of a power spectral density.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

One aspect of the disclosure is directed to a method of controlling a power spectral density of a pilot symbol and a data symbol for an uplink transmission by a mobile station in a wireless network. The method comprises determining a power spectral density of at least one of the data symbol and the pilot symbol based on a peak-to-average ratio (PAR) of at least one of the data symbol and the pilot symbol, and dynamically adjusting a power spectral density of at least one of the data symbol and the pilot symbol based on a difference between the PAR of the data symbol and a PAR of the pilot symbol.

Another aspect of the disclosure is directed to an apparatus for controlling a power spectral density of a pilot symbol and a data symbol for an uplink transmission by a mobile station in a wireless network. The apparatus comprises a processor configured to determine a power spectral density of at least one of the data symbol and the pilot symbol based on a PAR of at least one of the data symbol and the pilot symbol, and an adjustable gain unit configured to dynamically adjust a power spectral density of at least one of the data symbol and the pilot symbol based on a difference between the PAR of the data symbol and a PAR of the pilot symbol.

Yet another aspect of the disclosure is directed to an apparatus for controlling a power spectral density of a pilot symbol and a data symbol for an uplink transmission by a mobile station in a wireless network. The apparatus comprises means for determining a power spectral density of at least one of the data symbol and the pilot symbol based on a PAR of at least one of the data symbol and the pilot symbol; and means for dynamically adjusting a power spectral density of at least one of the data symbol and the pilot symbol based on a difference between the PAR of the data symbol and a PAR of the pilot symbol.

Yet another aspect of the present disclosure is directed to a computer program product comprising a computer-readable medium. The computer-readable medium comprises code for causing a computer to determine a power spectral density of at least one of a data symbol and a pilot symbol based on a PAR of the data symbol, and code for causing a computer to dynamically adjust a power spectral density of at least one of the data symbol and the pilot symbol based on a difference between the PAR of the data symbol and a PAR of the pilot symbol.

Yet another aspect of the present disclosure is directed to a processor executing instructions for controlling a power spectral density of a pilot symbol and a data symbol for an uplink transmission by a mobile station in a wireless network. The instructions include determining a power spectral density of at least one of the data symbol and the pilot symbol based on a PAR of at least one of the data symbol and the pilot symbol, and dynamically adjusting a power spectral density of at least one of the data symbol and the pilot symbol based on a difference between the PAR of the data symbol and a PAR of the pilot symbol.

It is to be understood that both the foregoing general description and the following detailed description are exemplary and are intended to provide further explanation of the claimed subject matter.

BRIEF DESCRIPTION OF THE DRAWINGS

The features, nature and advantages of the present disclosure will become more apparent from the detailed description set forth below when taken in conjunction with the drawings in which like reference characters identify correspondingly throughout and wherein.

DETAILED DESCRIPTION

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in details so as not to obscure the subject technology.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

Figure 1:
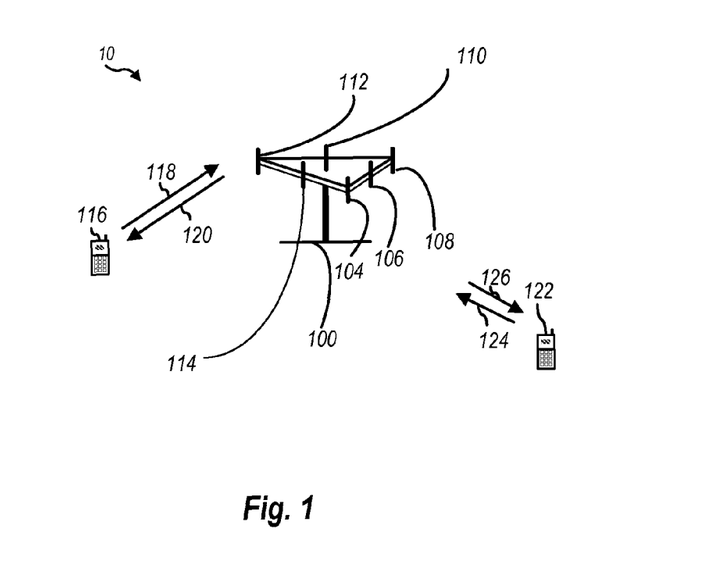
FIG. 1 is a schematic of a multiple access wireless communication system, according to certain aspects of the present disclosure.

FIG. 1 shows a multiple access wireless communication system 10 according to certain aspects of the present disclosure. An access point 100 includes multiple antenna groups, one including 104 and 106, another including 108 and 110, and an additional group including 112 and 114. In FIG. 1, only two antennas are shown for each antenna group, however, more or fewer antennas may be utilized for each antenna group. Access terminal 116 is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118 (i.e., uplink (UL) 118).

Each group of antennas and/or the area in which they are designed to communicate is often referred to as a sector of access point 100. In the embodiment shown in FIG. 1, each antenna group (e.g., antennas 112 and 114) is designed to communicate with access terminals (e.g., access terminal 116) in a given sector of the areas covered by access point 100.

In communication over forward links 120 and 126, the transmitting antennas of access point 100 utilize beamforming in order to improve the signal-to-noise ratio of forward links for the different access terminals 116 and 122. Also, access point 100 using beamforming to transmit to access terminals 116 and 122 scattered randomly through its coverage causes less interference to access terminals (not shown) in neighboring cells (not shown) than an access point 100 transmitting through a single antenna to all its access terminals.

Access point 100 may be a fixed station used for communicating with access terminals 116 and 122 and may also be referred to as a Node B, or some other terminology. During an uplink transmission, access point 100 may be referred to as a receiving side. Access terminals 116 and 122 may also be called user equipment (UE), wireless communication devices, terminals, stations, or some other terminology.

Figure 2:
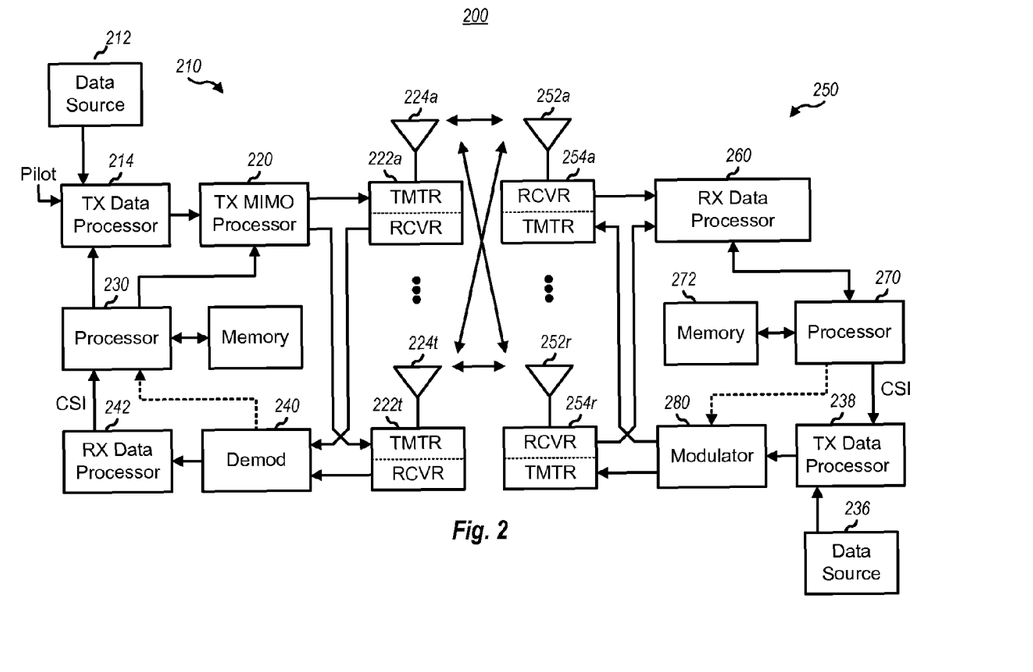
FIG. 2 is a block diagram of elements of a wireless communication system, according to certain aspects of the present disclosure.

FIG. 2 is a block diagram illustrating an exemplary transmitter system 210 (also known as the access point 100) and a receiver system 250 (also known as at least one of access terminals 116 and 122) in a MIMO system 200, according to certain aspects of the present disclosure. At the transmitter system 210, traffic data for a number of data streams is provided from a data source 212 to a transmit (TX) data processor 214.

In a downlink transmission, for example, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and pluarlity of PHY channels. The PHY channels comprises a set of DL channels and UL channels.

According to certain aspects, the DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and Load Indicator Channel (LICH). However, the DL PHY is not limited to any particular configuration.

According to certain aspects, the UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and Broadband Pilot Channel (BPICH). However, the UL PHY is not limited to any particular configuration.

Figure 3:
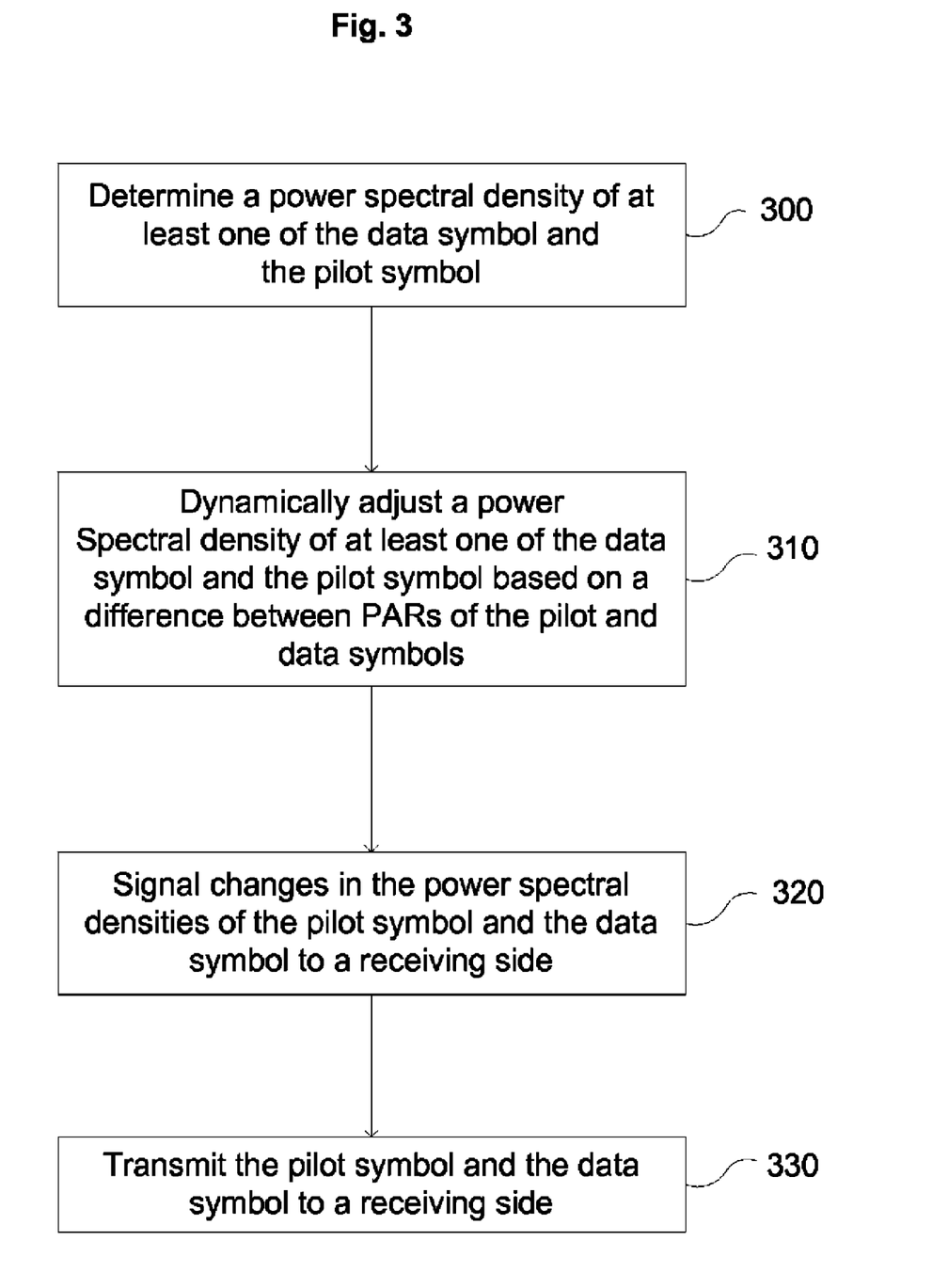
FIG. 3 is a flowchart illustrating a method of controlling a power spectral density of a pilot symbol and a data symbol for an uplink transmission by a mobile station in a wireless network, according to certain aspects of the present disclosure.

FIG. 3 is a flowchart illustrating a method of controlling a power spectral density of a pilot symbol and a data symbol for an uplink transmission by a mobile station 116 or 122 in a wireless network, according to certain aspects of the present disclosure. The present disclosure refers to E-UTRA UL transmissions; however, it should be noted that any UL transmission may be employed to provide the claimed features. LFDM may be selected as the transmission waveform, due to its peak-to-average ratio (PAR) advantages. According to E-UTRA specifications, QPSK and 16 QAM are the baseline modulation schemes for data transmission. In addition, however, 64 QAM for users with high signal-to-noise rations (SNR) may be employed. Constant envelop sequences such as a Zadoff-Chu sequence, for example, may be selected as a pilot sequence. According to certain aspects, the pilot and data are transmitted in TDM within each sub-frame, where the pilot generally occupies two short LFDM symbols and data occupies six long LFDM symbols. Of course, the present disclosure is not limited to the configuration described above, and one of ordinary skill in the art would realize that various techniques could be implemented.

At step 300, access terminal 116, for example, determines a power spectral density of at least one of a data symbol and a pilot symbol based on a peak-to-average ratio (PAR) of the data symbol, with respect to the particular transmission scheme used by access terminal 116. The power spectral density is determined such that it is within a maximum power defined by a linear region of a power amplifier of the wireless communication system 10. Therefore, the power spectral density of the data symbol, for example, is reduced by an adjustable digital gain unit (not shown) within access terminal 116 so that the difference between the maximum power (within the linear region) of the power amplifier and the power spectral density of the data symbol is at least the PAR of the data symbol, for example.

From step 300, the process proceeds to step 310, where the power spectral density of at least one of the pilot channel and the data channel is dynamically adjusted based on a difference between a PAR of the pilot symbol and the PAR of the data symbol. For the pilot symbol, if a polyphase sequence such as Zadoff-Chu sequence, for example, is used, the pilot sequence would have a constant envelop in time. As a result, the PAR of the pilot symbol is 0 dB. Therefore, in this case, the power amplifier back-off is much more relaxed due to the constant envelop properties of the Zadoff-Chu sequences. The power spectral density of the pilot symbol may be increased, by the adjustable digital gain unit, by the difference between the PAR of the data symbol and the PAR of the pilot symbol so that the power spectral density of the pilot symbol is also within the linear region of the power amplifier. If, for example, the transmitted power spectral density of the pilot symbol burst is increased by 4-5 dB, this can significantly improve channel estimation for headroom-limited users near the edges of the wireless network coverage area, which results in higher system coverage or overall sector throughput.

Figure 4:
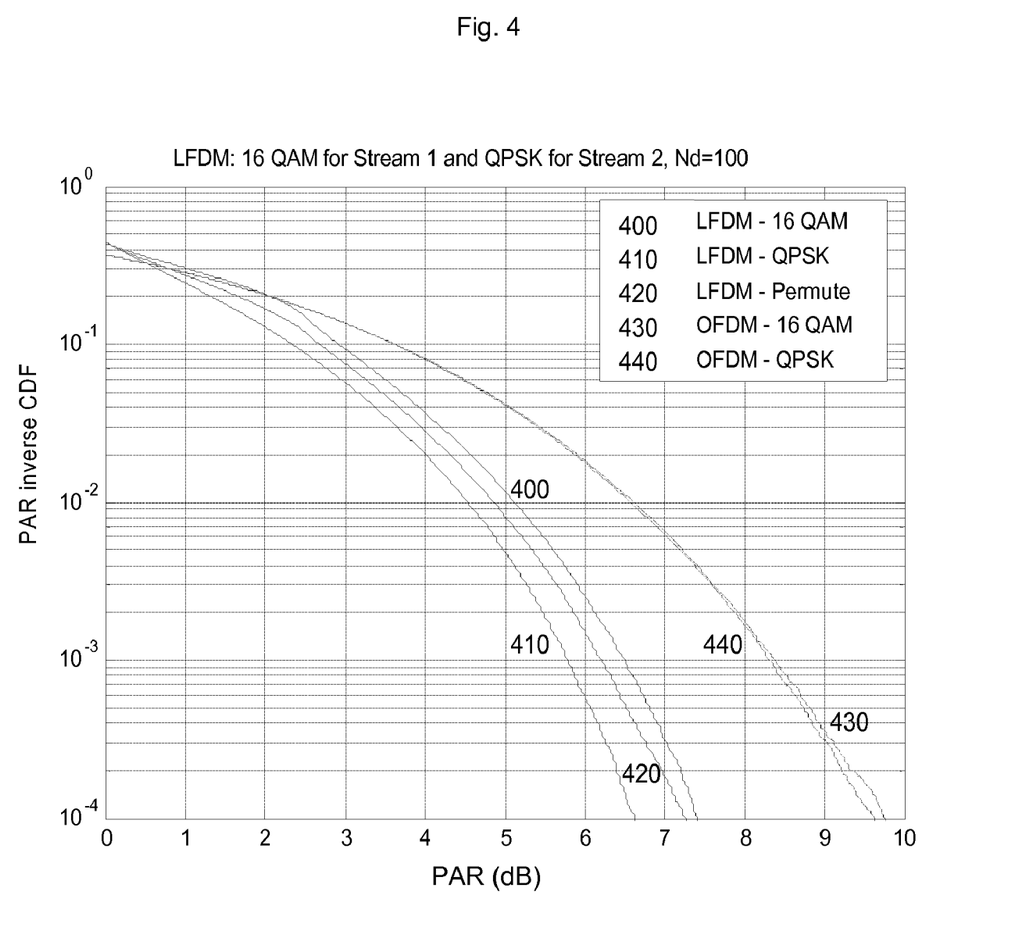
FIG. 4 is an exemplary PAR (dB) curve for QPSK and 16 QAM, according to certain aspects of the present disclosure.
Figure 5:
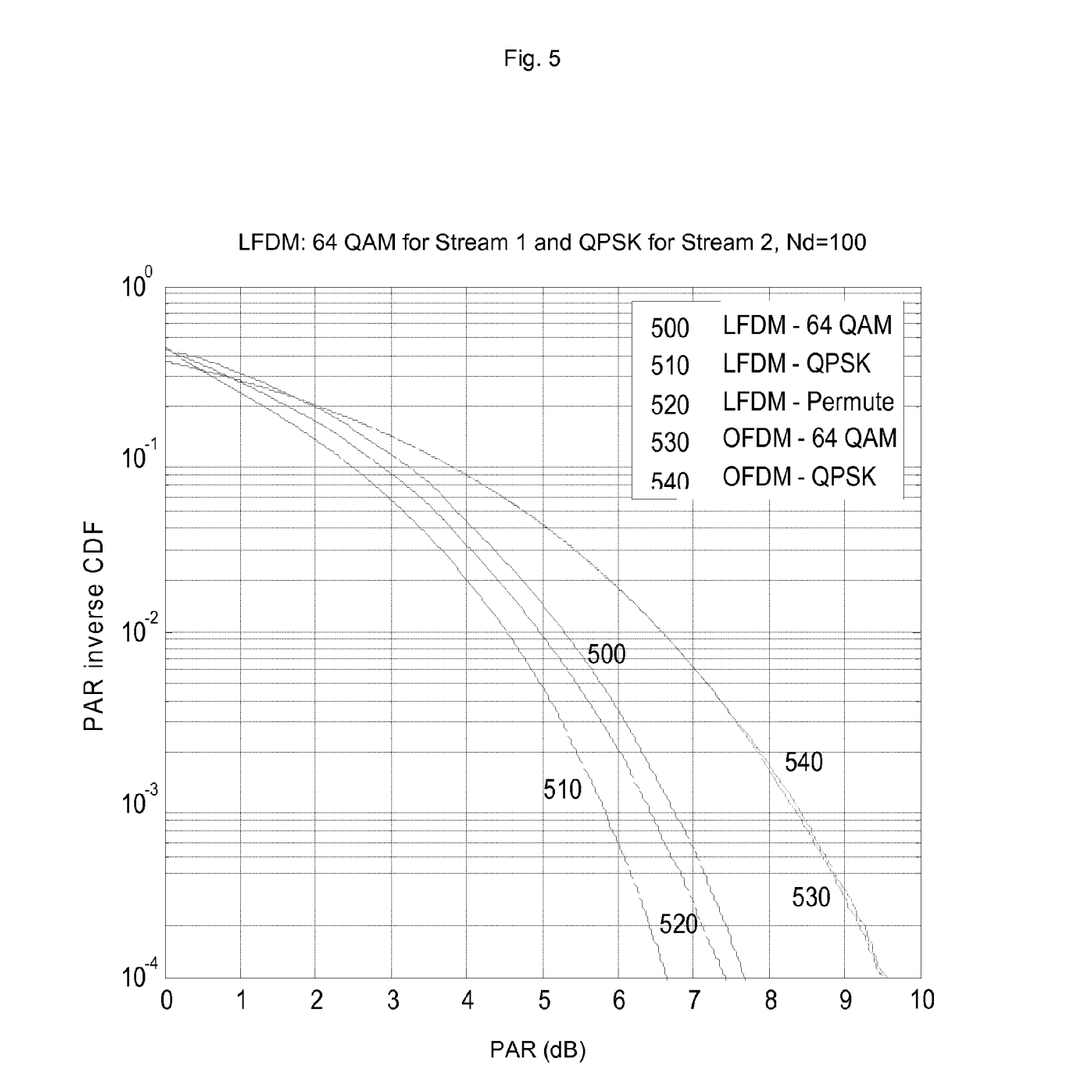
FIG. 5 is an exemplary PAR (dB) curve for QPSK and 64 QAM, according to certain aspects of the present disclosure.

The PAR of the data symbol, for example, is obtained from a lookup table within memory 272 of access terminal 116, based on respective modulation schemes. FIG. 4 shows an exemplary PAR (dB) curve for QPSK and 16 QAM, according to certain aspects of the present disclosure. Reference numerals 400, 410, 420, 430 and 440 show PAR curves for LFDM-16 QAM, LFDM-QPSK, LFDM-Permute, OFDM-16 QAM and OFDM-QPSK, respectively. FIG. 5 is an exemplary PAR (dB) curve for QPSK and 64 QAM, according to certain aspects of the present disclosure. Reference numerals 500, 510, 520, 530 and 540 show PAR curves for LFDM-64 QAM, LFDM-QPSK, LFDM-Permute, OFDM-64 QAM and OFDM-QPSK, respectively.

For example, as shown in FIGS. 4 and 5, for SIMO users: QPSK: At 1%, the PAR for QPSK is 4.5 dB (reference numeral 410); 16 QAM: At 1%, the PAR for 16 QAM is 5.1 dB (reference numeral 400); 64 QAM: At 1%, the PAR for 64 QAM is 5.3 dB (reference numeral 500). For MIMO users: the PARs for QPSK and 16 QAM remain the same if no permutation is applied to multiple antenna streams; and the PAR is 4.8 dB if antenna permutation is applied to the streams of QPSK and 16 QAM. Access terminal 116 has a priori knowledge of these values provided by the PAR curves, and stores respective PAR values in the lookup table. Using these PAR values, processor 270 determines the changes in power spectral density for the data and pilot symbols using the process described above.

Using E-UTRA UL transmissions, for example, there are two different UL numerologies that may typically be considered. First, according to an aspect, there may be 4 short TDM pilot bursts and 12 long TDM data bursts within each 1 ms transmit terminal identification (TTI). With this configuration, the power spectral densities of the pilot and data symbols may be adjusted 8 times within the TTI. Second, according to an aspect, there may be 2 long TDM pilot bursts and 12 long TDM data bursts within each 1 ms TTI. With this configuration, the power spectral densities of the pilot and data symbols may be adjusted only four times within the TTI. Of course, these UL numerologies are merely examples and any other numerology may be used.

According to certain aspects, from step 310, the process proceeds to step 320, where the changes in the power spectral densities of the pilot and data symbols are signaled to a receiving side (e.g., access point 100). The transmitted power spectral densities for the pilot and data symbols are calculated based on a power spectral density level of a reference signal and a delta power spectral density adjustment (i.e., the change in the power spectral density) with respect to the reference signal power spectral density level. Thus, access terminal 116 may become aware of the power spectral density of the reference symbol used by access point 100.

Figure 6:
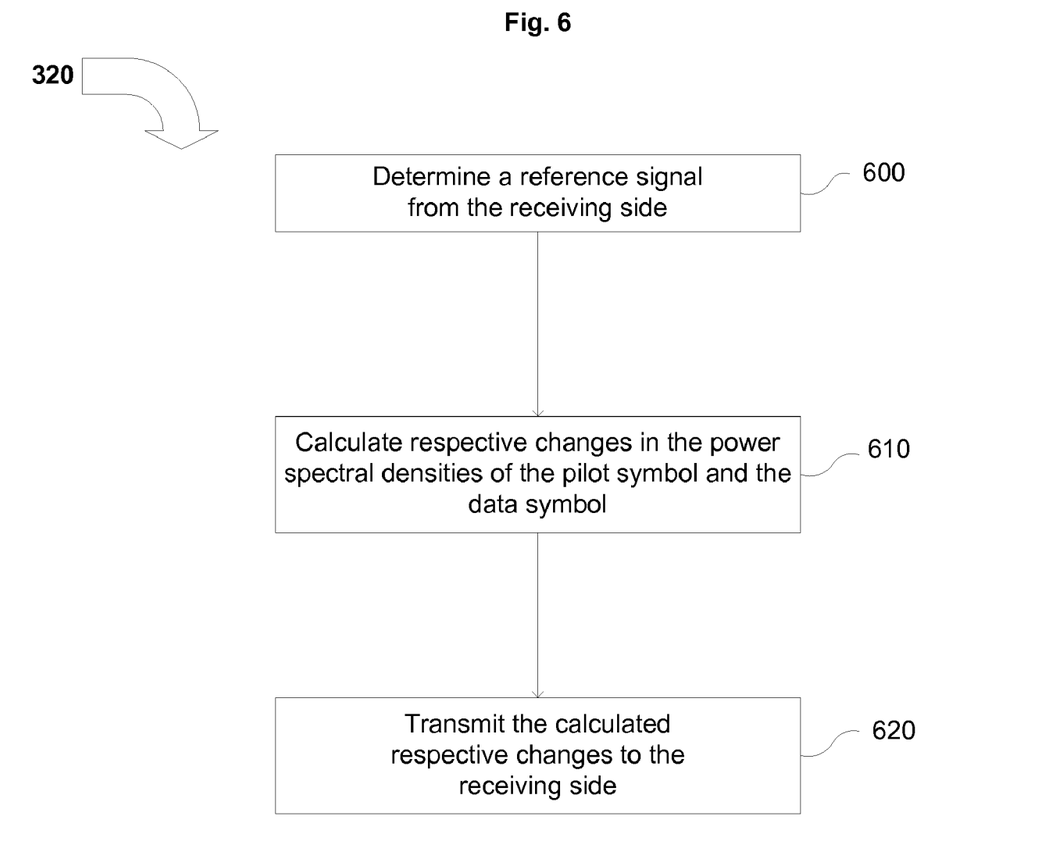
FIG. 6 is a flowchart illustrating a method of signaling changes in the power spectral densities of the pilot symbol and the data symbol to a receiving side, according to certain aspects of the present disclosure.

FIG. 6 is a flowchart illustrating a method of signaling changes in the power spectral densities of the pilot symbol and the data symbol to access point 100 (as described above with reference to FIG. 3), according to certain aspects of the present disclosure. At step 600, processor 270 within access terminal 116 determines a power spectral density of a reference signal used by access point 100. According to certain aspects, two potential candidates for the reference signal may exist: a CQI channel, which is transmitted every 2 ms, where QPSK modulation is used for the CQI channel; or a broadband pilot, which is transmitted every 10 ms. Constant envelop sequences, such as Zadoff-Chu sequences, may be employed as the broadband pilot sequence. Of course, the present disclosure is not limited to these two candidate reference signals, and other reference signals may be employed to achieve the claimed features. When the precise reference signal is known by the access terminal 116, the power spectral density thereof will be known, as it is stored in memory 272.

In order to determine the power spectral density of the reference signal, the access terminal 116 first determines which reference signal is used by access point 100. As one example, the reference signal may be consistent throughout the wireless network and, thus, access terminal 116 is always aware of the specifications of the reference signal. As another example, if both CQI and broadband pilots are used as reference signals, but it is the same for all the access terminals 116 within a sector, then the type of reference signal may be broadcasted in BCH. As yet another example, if both CQI and broadband pilots are used as reference signals for different access terminals 116 in a given sector (e.g., using different reference signals depending on the user speed), then the type of reference signal may be indicated through L3 signaling.

From step 600, the process proceeds to step 610, where respective changes in the power spectral densities of the pilot symbol and the data symbol are calculated. The change in the power spectral density of the pilot symbol is determined based on a difference between the power spectral density of the pilot symbol and a power spectral density of a reference signal, and the change in the power spectral density of the data symbol is determined based on a difference between the power spectral density of the data symbol and the power spectral density of the reference signal.

From step 610, the process proceeds to step 620, where the calculated respective changes in the power spectral densities of the pilot and data symbols are transmitted to access point 100.

Referring back to FIG. 3, from step 320, the process proceeds to step 330, where the pilot symbol and data symbol are transmitted to access point 100.

Figure 7:
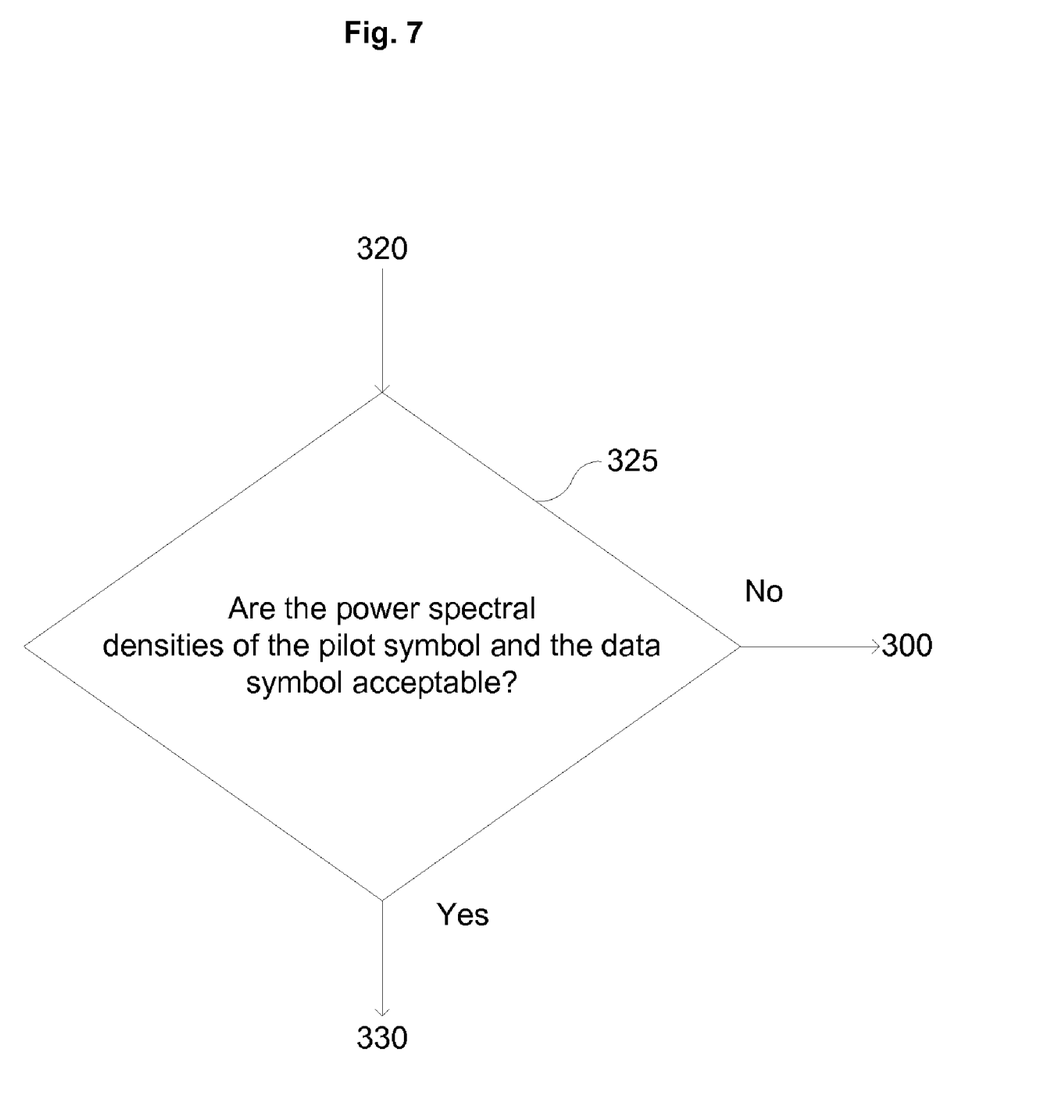
FIG. 7 is a flowchart illustrating a method of determining whether power spectral densities of pilot and data symbols are acceptable, according to certain aspects of the present disclosure.

FIG. 7 is a flowchart illustrating a method of determining whether power spectral densities of pilot and data symbols are acceptable, according to certain aspects of the present disclosure. After the changes in the power spectral densities of the pilot and data symbols are signaled to access point 100 (as described with reference numeral 320 of FIG. 3), the process may move to step 325, where access point 100 determines whether the power spectral densities of the pilot and data symbols are acceptable. Criteria for determining whether the pilot and data symbols are acceptable could include the total transmit power not exceeding a predetermined value set by an access terminal 116 requirement, or maintaining the operation region within the power amplifier linear operation range.

If the adjusted power spectral densities of the pilot and data symbols are acceptable, then the process proceeds to step 330, and the pilot and data symbols are transmitted to access point 100 as described above. If access point 100 determines that the power spectral densities are not acceptable, the process returns to step 300, where a new power spectral density of the data symbol is determined, and the process of FIG. 3 proceeds as described above.

Although the above example is based on determining a power spectral density of the data symbol and dynamically adjusting a power spectral density of the pilot symbol based on the different between PARs of the pilot an data symbols, one skilled in the art would realize that the opposite could also occur. That is, a power spectral density of the pilot symbol could be determined and a power spectral density of the data symbol could be dynamically adjusted based on the different between PARs of the pilot an data symbols.

For E-UTRA UL transmissions, the network coverage is determined by the edge users who transmit at the peak power and still may not be able to close the link. For these low SNR users, channel estimation may dominate the link performance.

The extra freedom in adjusting the transmitted power spectral density of a pilot symbol allows the possibility of boosting T2P for the edge users without violating the power amplifier back off constraints. By exploiting the PAR advantage of the Zadoff-Chu sequence selected for pilot, for example, one can further increase the pilot power spectral density so both data and pilot fully utilize the power amplifier. The enhanced channel estimation can help the edge users to achieve better link efficiency and results in a coverage increase.

It should be understood that the specific order or hierarchy of steps in the processed disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of ordinary skill in the art would understand that the information and signal may be represented using any of a variety of different technologies and techniques. For example, data, instructions, commands information signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical modules, circuits and algorithms described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a filed programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional process, control, microcontroller, or state machine. A process may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROB memory, EPROM memory, EEPROM memory, registers, hard disk, a removable disk, a CD-ROM, or any other form of storage medium known in the art. An exemplary storage medium is coupled to the processor such that the processor can read information from and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the disclosure. Thus, the present disclosure is not intended to be limited to the aspects shown herein but is to be accorded the widest scope consistent with the principles and novel features disclosed herein.

What is claimed is:

1. A method of controlling a power spectral density of a pilot symbol and a data symbol for an uplink transmission by a mobile station in a wireless network, the method comprising:
   determining, using the mobile station, a power spectral density of at least one of the data symbol and the pilot symbol based on a peak-to-average ratio (PAR) of at least one of the data symbol and the pilot symbol; and
   dynamically adjusting, using the mobile station, a power spectral density of at least one of the pilot symbol and the data symbol based on a difference between the PAR of the data symbol and a PAR of the pilot symbol.

2. The method of claim 1, further comprising obtaining the PAR of the data symbol and the PAR of the pilot symbol from a lookup table based on a modulation scheme.

3. The method of claim 1, further comprising signaling changes in the power spectral densities of the pilot symbol and the data symbol to a receiving side of the uplink transmission.

4. The method of claim 1, further comprising transmitting the pilot symbol and the data symbol to a receiving side of the uplink transmission.

5. The method of claim 3, wherein the signaling comprises:
   determining a reference signal from the receiving side;
   calculating respective changes in the power spectral densities of the pilot symbol and the data symbol based on a power spectral density of the reference signal; and
   transmitting the calculated respective changes to the receiving side.

6. The method of claim 5, wherein the reference signal is a channel quality indicator (CQI) channel with QPSK modulation.

7. The method of claim 5, wherein the reference signal is a broadband pilot.

8. The method of claim 5, wherein the reference signal is determined using a broadcast channel (BCH) broadcast when both channel quality indicator (CQI) and broadband pilots are used as the reference signal in the wireless network, but only one is used within a sector.

9. The method of claim 5, wherein the reference signal is determined through L3 signaling when both channel quality indicator (CQI) and broadband pilots are used as the reference signal in a sector.

10. The method of claim 5, wherein the reference signal is consistent throughout the wireless network.

11. The method of claim 1, further comprising determining, by a receiving side, whether the power spectral densities of the pilot symbol and the data symbol are acceptable to transmit.

12. An apparatus for controlling a power spectral density of a pilot symbol and a data symbol for an uplink transmission by a mobile station in a wireless network comprising:
    a processor configured to determine a power spectral density of at least one of the data symbol and the pilot symbol based on a peak-to-average ratio (PAR) of at least one of the data symbol and the pilot symbol; and
    an adjustable gain unit configured to dynamically adjust a power spectral density of at least one of the pilot symbol and the data symbol based on a difference between the PAR of the data symbol and a PAR of the pilot symbol.

13. The apparatus of claim 12, wherein the PAR of the data symbol and the PAR of the pilot symbol are obtained from a lookup table based on a modulation scheme.

14. The apparatus of claim 12, further comprising a transmitter configure to signal changes in the power spectral densities of the pilot symbol and the data symbol to a receiving side of the uplink transmission.

15. The apparatus of claim 12, further comprising a transmitter configured to transmit the pilot symbol and the data symbol to a receiving side of the uplink transmission.

16. The apparatus of claim 14, further comprising:
    a processor configured to determine a reference signal form the receiving side and to calculate respective changes in the power spectral densities of the pilot symbol and the data symbol based on a power spectral density of the reference signal; and
    a transmitter configured to transmit the calculated respective changes to the receiving side.

17. The apparatus of claim 16, wherein the reference signal is a channel quality indicator (CQI) channel with QPSK modulation.

18. The apparatus of claim 16, wherein the reference signal is a broadband pilot.

19. The apparatus of claim 16, wherein the reference signal is determined using a broadcast channel (BCH) broadcast when both channel quality indicator (CQI) and broadband pilots are used as the reference signal in the wireless network, but only one is used within a sector.

20. The apparatus of claim 16, wherein the reference signal is determined through L3 signaling when both channel quality indicator (CQI) and broadband pilots are used as the reference signal in a sector.

21. The apparatus of claim 16, wherein the reference signal is consistent throughout the wireless network.

22. The apparatus of claim 12, further comprising a determining unit, at a receiving side, configured to determine whether the power spectral densities of the pilot symbol and the data symbol are acceptable to transmit.

23. An apparatus for controlling a power spectral density of a pilot symbol and a data symbol for an uplink transmission by a mobile station in a wireless network, comprising:
    means for determining a power spectral density of at least one of the data symbol and the pilot symbol based on a peak-to-average ratio (PAR) of at least one of the data symbol and the pilot symbol; and
    means for dynamically adjusting a power spectral density of at least one of the pilot symbol and the data symbol based on a difference between the PAR of the data symbol and a PAR of the pilot symbol.

24. A computer program product, comprising:
    a non-transitory computer-readable storage medium comprising:
        code for causing a computer to determine a power spectral density of at least one of a data symbol and a pilot symbol based on a peak-to-average ratio (PAR) of at least one of the data symbol and the pilot symbol; and
        code for causing a computer to dynamically adjust a power spectral density of at least one of the data symbol and the pilot symbol based on a difference between the PAR of the data symbol and a PAR of the pilot symbol.

25. A processor executing instructions for controlling a power spectral density of a pilot symbol and a data symbol for an uplink transmission by a mobile station in a wireless network, the instructions comprising:
    determining a power spectral density of at least one of the data symbol and the pilot symbol based on a peak-to-average ratio (PAR) of at least one of the data symbol and the pilot symbol; and
    dynamically adjusting a power spectral density of at least one of the data symbol and the pilot symbol based on a difference between the PAR of the data symbol and a PAR of the pilot symbol.

* * * * *